United States Patent
Lee et al.

(10) Patent No.: US 8,030,248 B2
(45) Date of Patent: Oct. 4, 2011

(54) DRILLING FLUID AND PROCESS OF MAKING THE SAME

(75) Inventors: Burnell Lee, League City, TX (US); Georgia Lambert, La Porte, TX (US); Vahid Bagheri, League City, TX (US); Heath Chisholm, Webster, TX (US)

(73) Assignee: Ineos USA LLC, Lisle, IL (US)

( * ) Notice: Subject to any disclaimer, the term of this patent is extended or adjusted under 35 U.S.C. 154(b) by 0 days.

(21) Appl. No.: 12/484,962

(22) Filed: Jun. 15, 2009

(65) Prior Publication Data

US 2010/0317550 A1   Dec. 16, 2010

(51) Int. Cl.
*C09K 8/02* (2006.01)
*C09K 8/32* (2006.01)

(52) U.S. Cl. .......................... 507/103; 507/138; 507/905

(58) Field of Classification Search .................. 507/103, 507/138, 905
See application file for complete search history.

(56) References Cited

U.S. PATENT DOCUMENTS

| 4,463,211 | A | * | 7/1984 | Manning | 585/510 |
|---|---|---|---|---|---|
| 4,973,788 | A | * | 11/1990 | Lin et al. | 585/511 |
| H1000 | H | | 12/1991 | Patel et al. | |
| 5,171,905 | A | * | 12/1992 | Theriot et al. | 585/10 |
| 5,589,442 | A | * | 12/1996 | Gee et al. | 507/103 |
| 6,407,302 | B1 | * | 6/2002 | Twu et al. | 585/670 |
| 2004/0006250 | A1 | * | 1/2004 | Mathys et al. | 585/17 |

FOREIGN PATENT DOCUMENTS

| EP | 0 449 257 A2 | 10/1991 |
|---|---|---|
| EP | 1 795 572 A1 | 6/2007 |

* cited by examiner

*Primary Examiner* — Timothy J. Kugel
*Assistant Examiner* — Aiqun Li
(74) *Attorney, Agent, or Firm* — David P. Yusko; James J. Drake; Vik Panchal (57) ABSTRACT

This invention relates to drilling fluids and processes for making drilling fluids, such as for use in environmentally sensitive areas. The environmentally friendly drilling fluid includes a first fluid component having between about 5 weight percent to about 95 weight percent of olefins with a chain length in a range of between about C12 and about C48. The first fluid component includes at least about 50 weight percent trisubstituted olefin functionality. The environmentally friendly drilling fluid includes a second fluid component.

19 Claims, 4 Drawing Sheets

DRILLING FLUID AND PROCESS OF MAKING THE SAME

BACKGROUND

1. Technical Field

This invention relates to drilling fluids and processes for making drilling fluids, such as for use in environmentally sensitive areas.

2. Discussion of Related Art

Drilling fluids lubricate drilling components and carry cuttings to a surface of a borehole. Conventional drilling fluids include diesel and kerosene hydrocarbons which have poor biodegradability and/or toxicity when used in environmentally sensitive areas, such as marine environments. Synthetic drilling fluids seek to improve biodegradability, toxicity, and pour point properties. Even with the above improvements in the technology, there remains a need and a desire for drilling fluids with a low pour point and less polluting characteristics, such as good biodegradation and low toxicity.

SUMMARY

This invention relates to drilling fluids and processes for making drilling fluids, such as for use in environmentally sensitive areas. The fluid includes a low pour point and less polluting characteristics, such as good biodegradation and/or low toxicity. The fluid can be used in offshore applications and/or cold climate applications.

According to a first embodiment, this invention includes an environmentally friendly drilling fluid. The fluid includes a first fluid component having between about 5 weight percent to about 95 weight percent of olefins with a chain length in a range of between about C12 and about C48. The first fluid component includes at least about 50 weight percent trisubstituted olefin functionality. The fluid includes a second fluid component.

According to a second embodiment, this invention includes a drilling fluid suitable for use in environmentally sensitive areas. The fluid includes a linear portion including linear alpha olefins or linear internal olefins with carbon numbers of between about 6 carbons to about 30 carbons. The fluid includes an oligomer portion including dimers, trimers, and heavier oligomers of molecules with carbon numbers of between about 4 carbons and about 12 carbons. The trimers and heavier oligomers form at least about 20 mole percent of the oligomer portion. The oligomer portion forms between about 0.1 mole percent and about 50 mole percent of the fluid. The fluid has a pour point of about −20 degrees Celsius or lower, a biodegradation ratio of less than or equal to about 1.0, and a toxicity ratio of less than or equal to about 1.0.

According to a third embodiment, this invention includes a process of making an environmentally friendly drilling fluid. The process includes the step of providing a first fluid component having between about 5 weight percent to about 95 weight percent of olefins with a chain length in the range of between about C12 and about C48. The first fluid component includes at least about 50 weight percent trisubstituted olefin functionality. The process includes the step of mixing the first fluid component with a second fluid component.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention. In the drawings.

DETAILED DESCRIPTION

This invention relates to drilling fluids and processes for making drilling fluids, such as for use in environmentally sensitive areas.

According to one embodiment, this invention can include an environmentally friendly drilling fluid. The fluid can include a first fluid component including between about 5 weight percent to about 95 weight percent of olefins with a chain length in a range of between about C12 and about C48. The first fluid component can include at least about 50 weight percent trisubstituted olefin functionality. The drilling fluid can also include a second component.

Environmentally friendly broadly refers to materials and/or substances that can be used in and/or are compatible with plant life, animal life, marine life, and/or the like. Environmentally sensitive areas may include freshwater ecosystems, salt water ecosystems (offshore), temperate ecosystems, polar ecosystems (cold climates like Arctic regions and/or Antarctic regions), rainforest ecosystems, wetland ecosystems, arid ecosystems, and/or the like. Desirably, the environmentally friendly materials and/or substances may include good and/or improved biodegradability and/or toxicity. Drilling fluids suitable for use in environmentally sensitive areas may also be suitable for use in other less environmentally sensitive areas. According to one embodiment, the drilling fluid meets and/or exceeds standards for materials used in the Gulf of Mexico, such as for deepwater offshore oil drilling.

Drilling fluid and/or well fluid base oil broadly refers to any suitable substance and/or material used in boring and/or making a hole and/or tunnel, such as for extracting and/or removing crude oil, natural gas, bitumen, tar sands, sulfur, other elements, other compounds, other minerals, and/or the like. The fluid can be used in rotary drilling applications and/or the like. Drilling fluids may include solutions, mixtures, emulsions, slurries, suspensions, and/or the like. Drilling fluids may be predominately hydrocarbon based and/or predominantly water based.

Drilling fluid may sometimes be referred to as drilling mud, spotting fluid, lubricating additive, circulating fluid, and/or the like. The fluid can lubricate downhole equipment, such as a drill string and/or a drill bit. The fluid can also provide a carrier and/or transport for cuttings and/or other debris from a drilling process. The fluid can also form a filter cake, such as to prevent excursions into surrounding formations and/or media. The drilling fluid can also have a suitable density, such as to have hydrolytic stability.

Synthetic broadly refers to substances and/or materials produced and/or formed by a reaction of specific purified chemical feedstocks, such as internal olefins, polyalphaolefins, and/or the like.

Component broadly refers to any suitable part, ingredient, element, and/or the like.

Chain length broadly refers to a number of atoms forming and/or making a backbone and/or structure of a molecule and/or compound, such as carbon atoms for a hydrocarbon. The first fluid component can include any suitable length and/or size of molecule, such as a chain length in a range of between about C6 and about C80, between about C12 and about C48, between about C16 and about C32, between about C16 and about C24, about C16, and/or the like. As used herein the convention of "Cxx" refers to a number of carbon atoms in a molecule and/or compound where "xx" refers an integer of a suitable value, such as C8 for octane and/or octene.

Olefins broadly refer to unsaturated hydrocarbons, such as having at least one double bond. Alpha olefins broadly refer to having a point of unsaturation at a terminal and/or end atom of a chain length, such as 1-octene. Internal olefins broadly refer to having a point of unsaturation at a nonterminal and/or inside atom of a chain length, such as 3-octene. Olefins may be formed by any suitable process, such as oligomerization, metathesis, isomerization, cracking, dehydrogenation, and/or the like.

Hydrocarbons broadly refer to molecules and/or compounds with predominantly a carbon and/or hydrogen composition and/or make up. Hydrocarbons may be from any suitable source, such as from mineral oil and/or synthetically derived. Hydrocarbons may contain relatively small amounts of other elements, such as metals, nitrogen, sulfur, and/or the like.

The first fluid component can include any suitable amount of olefins, such between about 1 weight percent to about 100 weight percent, between about 5 weight percent to about 95 weight percent, between about 25 weight percent and about 75 weight percent, at least about 50 weight percent and/or the like.

Trisubstituted olefin functionality broadly refers to molecules, compounds, and/or components in which a carbon to carbon double bond connects to three carbons atoms and one hydrogen atom, such as to form a generally branched structure. The first fluid component can include any suitable amount of trisubstituted olefin functionality, such as at least about 30 weight percent, at least about 50 weight percent, at least about 60 weight percent, at least about 70 weight percent, at least about 80 weight percent, at least about 90 weight percent and/or the like.

The drilling fluid may include any suitable amount of the first fluid component, such as between about 0.1 weight percent and about 99.9 weight percent, between about 1 weight percent and about 50 weight percent, between about 10 weight percent and about 30 weight percent, and/or the like.

The drilling fluid may include any suitable amount of the second fluid component, such as between about 0.1 weight percent and about 99.9 weight percent, between about 50 weight percent and about 99 weight percent, between about 70 weight percent and about 90 weight percent, and/or the like.

The drilling fluid may include any suitable ratio of the first fluid component to the second fluid component, such as about 1:100, about 1:10, about 1:5, about 1:4, about 1:3, about 1:2, about 1:1, and/or the like.

The second fluid component may include any suitable elements, molecules, and/or compounds, such as linear alpha olefins, linear internal olefins, branched olefins, branched internal olefins, esters, mineral oils, enhanced mineral oils, oil-in-water emulsions, water-in-oil emulsions, paraffins, fatty acids, water, suspended solids, emulsifiers, deemulsifiers, flocculants, antiflocculants, coagulants, anticoagulants, viscosity increasers, viscosity decreasers, acidic components (lower pH), basic components (raise pH), buffer components (maintain pH), salts, clays, abrasive materials, stabilizers, proppants, and/or the like.

Linear broadly refers to having and/or forming an at least relatively straight and/or unbranched chain and/or line, such as one carbon atom connecting with two other carbon atoms and two hydrogen atoms.

Branched broadly refers to having and/or forming an at least relatively divergent and/or nonlinear chain and/or line, such as one carbon atom connecting with three other carbons atoms and one hydrogen atom.

According to one embodiment, the first fluid component may include oligomerized olefins. Oligomer broadly refers to molecules and/or compounds containing two or greater monomers and/or structural units, such as between about 2 and about 20, between about 2 and about 10, between about 2 and about 5, less than about 5, and/or the like. Monomers refer to single units of molecules, compounds, and/or units, such as alpha olefins, linear olefins, linear alpha olefins, internal olefins, linear internal olefins, branched olefins, branched alpha olefins, branched internal olefins, mixtures thereof, and/or the like. Dimers refer to oligomers with 2 units, trimers refer to oligomers with 3 units, tetramers refer to oligomers with 4 units, and pentamers refer to oligomers with 5 units.

Oligomers may include monomers with the same chain length and/or mixtures of monomers with different chain lengths. The first fluid component can include oligomers made from monomers with any suitable chain length, such as between about C4 and about C24, between about C4 and about C18, between about C4 and about C12, between about C6 and about C10, about C8, and/or the like. The use of even numbered and/or odd numbered chain lengths is within the scope of this invention.

The oligomerized olefins can include any suitable molecule and/or compound, such as alpha olefins, linear olefins, linear alpha olefins, internal olefins, linear internal olefins, branched olefins, branched alpha olefins, branched internal olefins, mixtures thereof, and/or the like.

The oligomerized olefins can be made by any suitable chemistry, process, method, and/or the like. According to one embodiment, the oligomerized olefins can be made and/or formed by acid type catalysts. Acid catalysts may include materials and/or substances with a pH of less than about 7.0, functioning as electron acceptors (Lewis acids), and/or the like. Catalyst broadly refers to materials and/or substances that change and/or affect a rate of a chemical reaction and/or transformation, such as by lowering an activation energy and/or speeding up the reaction. Catalysts can be homogenous, heterogeneous, and/or the like. Desirably, catalysts participate in, but do not become consumed by the reaction. Oligomerization catalysts may include sulfuric acid, alkyl aluminum, metal halides, boron trifluoride and/or the like.

The catalyst may also include one or more co-catalysts and/or solvents, such as a protic (donor) co-catalyst, an aprotic (not donor) co-catalyst, mixtures thereof, and/or the like. According to one embodiment, the acid type catalysts can include boron trifluoride promoted with a protic co-catalyst, an aprotic co-catalyst, and/or mixtures thereof.

Alternatively and/or additionally, the catalyst may also include an alcohol alkoxylate co-catalyst, such as boron trifluoride promoted by an alcohol alkoxylate. Suitable alcohol alkoxylates can include glycol ethers, ethylene glycol monomethyl ether (2-methoxyethanol), propylene glycol monoethyl ether, ethoxylates derived from mixed C2 to C24 straight chain alcohols, and/or the like. According to one embodiment, the alcohol alkoxylate can include 2-methoxyethanol.

The first fluid component can have any suitable distribution and/or amount of oligomers, such as dimers, trimers, tetramers, heavier oligomers, and/or the like. Desirably, but not necessarily, the oligomerized olefins can include predominantly dimers and trimers of a suitable monomer, such as 1-hexene, 1-octene, 1-decene, and/or the like. Predominantly broadly refers to for the most part, such as at least greater than about 50 weight percent, at least about 70 weight percent, at least about 90 weight percent, and/or the like.

The oligomerized olefins can have any suitable ratio of one oligomer to another, such as a dimer to trimer ratio of less than about 1:1, greater than about 1:1, and/or the like. According to one embodiment, oligomerized olefins can include predominantly dimers and trimers of 1-octene with a dimer to trimer ratio of greater than about 1:1.

The oligomerized olefins can have any suitable amount of an oligomer, such as at least about 30 weight percent dimer, at least about 60 weight percent dimer, at least about 90 weight percent dimer, and/or the like.

Another suitable oligomerization catalyst can include a heterogeneous solid acid catalyst, such as a polymeric resin and/or ion exchange resin with sulfonic acid functionality. Suitable polymeric catalysts may include Amberlyst™ available from Rohm and Haas, a wholly owned subsidiary of the Dow Chemical Company, Midland, Mich., U.S.A. The heterogeneous solid acid catalyst can yield any suitable oligomerized olefins, such as predominantly dimers and trimers of 1-octene with a dimer to trimer ratio of greater than about 1:1. Desirably, the heterogeneous solid acid catalyst can yield a first fluid component with at least about 90 weight percent dimer.

According to one embodiment, the first fluid component can include isomerized vinylidene olefins. Vinylidene broadly refers a structure in which a carbon to carbon double bond contains two hydrogen atoms at a terminal carbon atom and two alkyl substituent structures on an internal carbon atom. The vinylidene olefins can have any suitable chain length, such as a chain length of between about C6 and about C48, between about C12 and about C24, between about C16 and about C18, and/or the like. Desirably, but not necessarily, the vinylidene olefin can include hexadecene.

Vinylidene olefins can be made by any suitable chemistry, process, method, and/or the like. According to one embodiment, the vinylidene olefin can be made by alkyl aluminum catalyzed dimerization of a suitable molecule, such as 1-hexene, 1-octene, 1-decene, and/or the like.

Isomerized olefins can be made by any suitable chemistry, process, method, and/or the like. Isomerized broadly refers to having been changed and/or rearranged, such as a different chemical structure, but a same chemical formula. For example 1-hexadecene can be isomerized to 6-hexadecene. According to one embodiment, an isomerization catalyst can include a metal oxide, and/or the like.

The fluid can have any suitable pour point such as at least about 0 degrees Celsius or lower, at least about −10 degrees Celsius or lower, at least about −15 degrees Celsius or lower, at least about −20 degrees Celsius or lower, at least about −25 degrees Celsius or lower, at least about −30 degrees Celsius or lower, at least about −35 degrees Celsius or lower, at least about −40 degrees Celsius or lower, at least about −45 degrees Celsius or lower, at least about −50 degrees Celsius or lower, and/or the like. Pour point broadly refers to a lowest temperature a fluid will pour and/or flow.

The first fluid component can have any suitable pour point, such as at least about −10 degrees Celsius or lower, at least about −20 degrees Celsius or lower, at least about −30 degrees Celsius or lower, at least about −40 degrees Celsius or lower, at least about −50 degrees Celsius or lower, at least about −60 degrees Celsius or lower, at least about −65 degrees Celsius or lower, and/or the like.

The second fluid component can have any suitable pour point, such as at least about 15 degrees Celsius or lower, at least about 0 degrees Celsius or lower, at least about −9 degrees Celsius or lower, at least about −15 degrees Celsius or lower and/or the like.

Desirably, but not necessarily, the first fluid component can act as and/or function as a pour point depressant and/or lowering agent, such as to lower a pour point of the fluid lower than a pour point of the second fluid component alone (neat) by at least about 2 degrees Celsius, at least about 5 degrees Celsius, at least about 10 degrees Celsius, at least about 20 degrees Celsius, and/or the like.

The fluid can have any suitable viscosity, such as between about 0.1 centistokes to about 20 centistokes, between about 1.0 centistoke and about 10 centistokes, between about 1.4 centistokes and about 6.0 centistokes, and/or the like when measured at 100 degrees Celsius.

According to one embodiment, the fluid can have a biodegradation ratio of less than or equal to about 1.0 as measured by United States Environmental Protection Agency NPDES 2007 (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico, Protocol for the determination of degradation of Non-Aqueous base fluids in a marine closed bottle biodegradation test system, modified International Organization for Standardization (ISO) 11734: 1995 method. The biodegradation test compares the fluid to a reference standard of internal olefin molecules having 65 mole percent of molecules with a carbon number of 16 carbons and 35 mole percent of molecules with a carbon number of 18 carbons.

The biodegradation ratio can be defined by the equation below with numerators and denominators both based on percent, where a value of 1.0 or less forms an acceptable result.

$$\text{Biodegradation Ratio} = \frac{\text{theoretical gas production of reference standard}}{\text{theoretical gas production of test fluid}}$$

Desirably, the fluid has a biodegradation ratio of less than or equal to about 1.0, less than or equal to about 0.95, less than or equal to about 0.9, less than or equal to about 0.85, and/or the like. Biodegradation may be by anaerobic pathways and/or routes.

The entire teachings and contents of the U.S. Environmental Protection Agency's Final NPDES General Permit for New and Existing Sources and New Dischargers in the Offshore Subcategory of the Oil and Gas Extraction Category for the Western Portion of the Outer Continental Shelf of the Gulf of Mexico (GMG290000 and TXG330000) with all supplements and/or notations and International Organization for Standardization 11734:1995 method are hereby incorporated by reference into this specification in their entirety.

According to one embodiment, the fluid can have an improved biodegradability of at least about 5 percent over both a biodegradability of the first fluid component alone and the second drilling fluid component alone, at least about 10 percent over both a biodegradability of the first fluid component alone and the second drilling fluid component alone, at least about 15 percent over both a biodegradability of the first fluid component alone and the second drilling fluid component alone, at least about 20 percent over both a biodegradability of the first fluid component alone and the second drilling fluid component alone, at least about 25 percent over both a biodegradability of the first fluid component alone and the second drilling fluid component alone, at least about 30 percent over both a biodegradability of the first fluid component alone and the second drilling fluid component alone, and/or the like.

According to one embodiment, the fluid can have a toxicity ratio of less than or equal to about 1.0. as measured by American Society for Testing and Materials (ASTM) method E1367-99 testing protocol as required in the United States Environmental Protection Agency NPDES (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico which uses Leptocheirus Plumulosus in a 10-day sediment toxicity test. The toxicity test compares the fluid to a reference standard of internal olefin molecules having 65 mole percent of molecules with a carbon number of 16 carbons and 35 mole percent of molecules with a carbon number of 18 carbons.

The toxicity ratio can be defined by the equation below and based on weight percent, where a value of 1.0 or less forms an acceptable result and $LC_{50}$ represents a concentration in milligrams per liter needed to kill half a sample population of a test subject.

$$\text{Toxicity Ratio} = \frac{\text{10-day } LC_{50} \text{ of reference standard}}{\text{10-day } LC_{50}}$$

Desirably, the fluid has a toxicity ratio of less than or equal to about 1.0, less than or equal to about 0.95, less than or equal to about 0.9, less than or equal to about 0.85, and/or the like.

The entire teachings and contents of American Society for Testing and Materials method E1367-99 testing protocol are hereby incorporated by reference into this specification in their entirety.

According to one embodiment, the fluid can have an improved toxicity of at least about 5 percent over both a toxicity of the first fluid component alone and the second drilling fluid component alone, at least about 10 percent over both a toxicity of the first fluid component alone and the second drilling fluid component alone, at least about 15 percent over both a toxicity of the first fluid component alone and the second drilling fluid component alone, at least about 20 percent over both a toxicity of the first fluid component alone and the second drilling fluid component alone, at least about 25 percent over both a toxicity of the first fluid component alone and the second drilling fluid component alone, at least about 30 percent over both a toxicity of the first fluid component alone and the second drilling fluid component alone, and/or the like.

Without being bound by theory of operation, generally larger molecules, such as carbon numbers above C18, have a lower (poorer) biodegradability factor, since it is a larger molecule and takes a longer time for microbes to digest the larger molecule. Generally larger molecules have a higher (better) toxicity factor, since smaller molecules break down into compounds that are toxic when consumed into microbes. Since larger molecules break down into remaining large compounds, the larger molecules may not be readily consumed into the microbes and result in a better toxicity factor.

Surprisingly and unexpectedly, the first fluid component of this invention has an improved biodegradation and a good toxicity when blended with the second fluid component. Without being bound by theory, the trisubstituted and/or branched molecules may provide multiple points for microbes to attack and/or digest the molecule to allow for better biodegradation while remaining large enough to have lower toxicity.

Also surprisingly and unexpectedly, the first fluid component with higher carbon numbers of this invention, such as at least about 20 weight percent C24 (trimer), has a good biodegradation.

The drilling fluid (first fluid component and second fluid component) can provide both good biodegradation, and good toxicity even using larger molecules, according to one embodiment.

Desirably, the drilling fluid and/or fluid components of the drilling fluid do not include and/or contain polycyclic aromatic hydrocarbons and/or polynuclear aromatic hydrocarbons, such as liquids made by synthetic processes and/or steps. The first fluid component can include any minimal amount and/or content of polycyclic aromatic hydrocarbons and/or polynuclear aromatic hydrocarbons, such as less than about 0.00001 grams of polycyclic aromatic hydrocarbons per gram of a base fluid (passing test level), about 0 grams of polycyclic aromatic hydrocarbons per gram of a base fluid, and/or the like.

Similarly, the fluid including both the first fluid component and the second fluid component may include any minimal amount or content of polycyclic aromatic hydrocarbons or polynuclear aromatic hydrocarbons, such as less than about 0.00001 grams of polycyclic aromatic hydrocarbons per gram of a base fluid, about 0 grams of polycyclic aromatic hydrocarbons per gram of a base fluid, and/or the like.

According to one embodiment, the first fluid component is not isomerized and/or hydrogenated (saturated). In the alternative, the first fluid component may be isomerized and/or hydrogenated.

This invention can include a drilling fluid suitable for use in environmentally sensitive areas, according to one embodiment. The fluid can include a linear portion including linear alpha olefins or linear internal olefins with carbon numbers of between about 6 carbons to about 30 carbons. The fluid can also include an oligomer portion including dimers, trimers, and heavier oligomers of molecules with carbon numbers of between about 4 carbons and about 12 carbons. The trimers and heavier oligomers may include at least about 20 mole percent of the oligomer portion, and the oligomer portion may include between about 0.1 mole percent and about 50 mole percent of the fluid. The fluid can have a pour point of about −20 degrees Celsius or lower, a biodegradation ratio of less than or equal to about 1.0, and a toxicity ratio of less than or equal to about 1.0.

Portion broadly refers to a part and/or a share of something. Desirably, but not necessarily, the oligomer portion may include at least about 50 mole percent of trisubstituted molecules, at least about 70 mole percent of trisubstituted molecules, at least about 90 mole percent of trisubstituted molecules, and/or the like.

According to one embodiment, this invention may include a process of making an environmentally friendly drilling fluid. The process can include the step of providing a first fluid component having between about 5 weight percent to about 95 weight percent of olefins with a chain length in the range of between about C12 and about C48. The first fluid component can include at least about 50 weight percent trisubstituted olefin functionality. The process can also include the step of mixing the first fluid component with a second fluid component.

The first fluid component of the process may include any of the features and/or functions of the first fluid component of any of the drilling fluids described above. Similarly, the second fluid component of the process may include any of the features and/or functions of the second fluid component of any of the drilling fluids described above.

The process may further include the step of oligomerizing linear alpha olefins, linear internal olefins, branched alpha olefins, branched internal olefins, branched olefins, mixtures thereof, and/or the like. A feedstock for the step of oligomerizing may include molecules and/or monomers with any suitable chain length, such as with a chain length of between about C4 and about C24, between about C4 and about C12, between about C6 and about C10, between about C6 and about C8, about C8, and/or the like. Desirably, the oligomerizing can form the first fluid component.

The step of oligomerizing may use any suitable chemistry, process, method, and/or the like. The step of oligomerizing can use acid type catalysts, such as boron trifluoride promoted with a protic co-catalyst, an aprotic co-catalyst, mixtures thereof, and/or the like. According to one embodiment, the acid type catalysts of the process uses boron trifluoride promoted by an alcohol alkoxylate, such as 2-methoxyethanol, and/or the like.

The step of oligomerizing may form any suitable distribution of molecules and/or compounds, such as predominantly dimers and trimers of 1-octene with a dimer to trimer ratio of greater than about 1:1.

Desirably, but not necessarily, the process may further include the step of purifying the first fluid component to include at least about 90 weight percent dimer. Any suitable purification step, method, and/or process can be used for purification, such as distillation, extraction, sorption, and/or the like.

The process may use any of the catalysts with respect to the drilling fluids described above, such as a heterogeneous solid acid catalyst. The solid acid catalyst can be any suitable material, such as polymeric resin.

Desirably, the step of oligomerizing with the solid acid catalyst forms and/or makes predominantly dimers and trimers of 1-octene with a dimer to trimer ratio of greater than about 1:1. The materials and/or compounds made with the solid acid catalyst may also be purified so the first fluid component may include at least about 90 weight percent dimer.

According to one embodiment, the process may further include the step of isomerizing vinylidene olefins. The vinylidene olefins can have any suitable chain length, such as a chain length of between about C12 and about C24. Desirably, the isomerization forms the first fluid component. The vinylidene olefins may include hexadecene, for example.

The process may also include the step of dimerizing 1-octene catalyzed by alkyl aluminum to form the vinylidene olefins, according to one embodiment.

The drilling fluid of the process may include any of the biodegradation and/or toxicity features and/or functions with respect to any of the drilling fluids described above.

The drilling fluid made by the process may have a biodegradation ratio of less than or equal to about 1.0 as measured by United States Environmental Protection Agency NPDES 2007 (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico, Protocol for the determination of degradation of Non-Aqueous base fluids in a marine closed bottle biodegradation test system, modified international standards organization 11734:1995 method. The biodegradation test compares the fluid to a reference standard of internal olefin molecules having 65 mole percent of molecules with a carbon number of 16 carbons and 35 mole percent of molecules with a carbon number of 18 carbons.

The process may make and/or form a fluid with an improved biodegradability of any suitable amount, such as at least about 10 percent over both a biodegradability of the first fluid component alone and the second drilling fluid component alone.

The drilling fluid made by the process may have a toxicity ratio of less than or equal to about 1.0. as measured by American Society for Testing and Materials method E1367-99 testing protocol as required in the United States Environmental Protection Agency NPDES (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico which uses Leptocheirus Plumulosus in a 10-day sediment toxicity test. The toxicity test compares the fluid to a reference standard of internal olefin molecules having 65 mole percent of molecules with a carbon number of 16 carbons and 35 mole percent of molecules with a carbon number of 18 carbons.

The process may make and/or form a fluid with an improved toxicity of any suitable amount, such as at least about 10 percent over both a toxicity of the first fluid component alone and the second drilling fluid component alone. According to one embodiment, the first fluid component may be nontoxic to marine life.

According to one embodiment, the process can make and/or form a fluid with less than about 0.00001 grams of polycyclic aromatic hydrocarbons per gram of base fluid, about 0 grams of polycyclic aromatic hydrocarbons per gram of base fluid, and/or the like.

EXAMPLES

The following examples illustrate the preparation and testing of base fluids with a biodegradation enhancement component according to embodiments of this invention.

Example 1

The material of Example 1 was prepared by taking a C16 vinylidene molecule (made by alkyl aluminum catalyzed dimerization of 1-octene) and converting it to a primarily trisubstituted molecule. This was achieved by isomerizing 600 milliliters of C16 vinylidene using a ground alumina catalyst (AL3996R) for 3 hours at 235 degrees Celsius to form the material of Example 1. The material of Example 1 was then blended at a ratio of 10 weight percent of the material of Example 1 and 90 weight percent Amodrill® 1000 to form Blend 1. Amodrill® 1000 is available from Ineos Oligomers based in League City, Tex., U.S.A. Amodrill® 1000 is a synthetic olefin used for drilling muds. Table 1 shows the analysis of the materials of Example 1.

Figure 1:
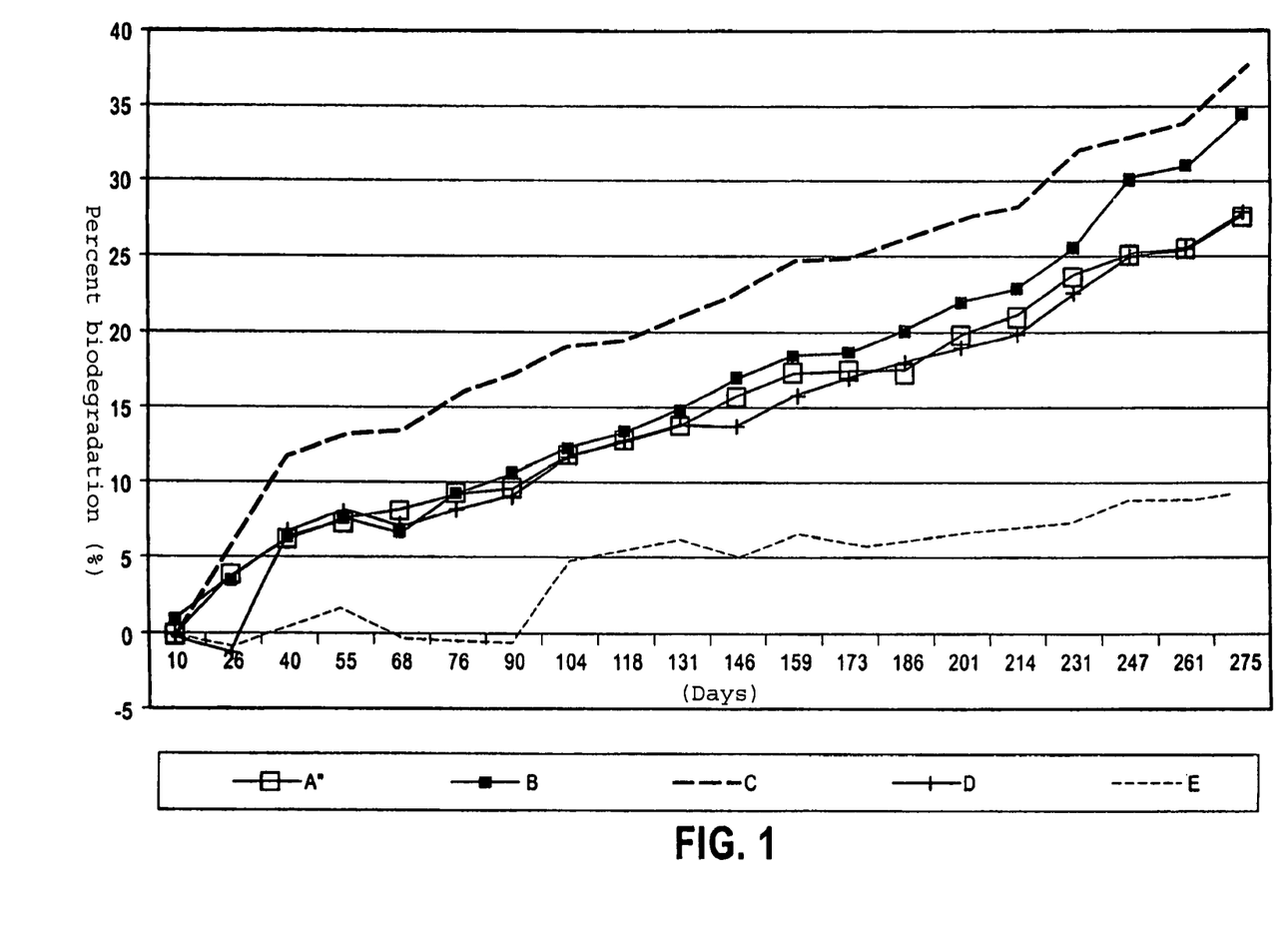
FIG. 1 shows a biodegradation graph of materials used in Example 1 and according to one embodiment.

FIG. 1 shows a graph of time in days (0 days to 275 days on x axis) versus percent biodegradation (higher is better on y axis) to the reference sample per the biodegradation test described above, for the reference samples (series A), the Amodrill® 1000 (series B), a 10 weight percent blend of the material of Example 1 and the Amodrill® 1000 (series C), a 20 weight percent blend of the material of Example 1 and the Amodrill® 1000 (series D), and a neat sample of the material of Example 1 (series E).

Biodegradation ratio and toxicity ratio were measured against a reference sample and according to the NPDES tests described above. Carbon number distribution was analyzed using gas chromatography techniques. Olefin distribution was analyzed using nuclear magnetic resonance techniques.

TABLE 1

|  | Example 1 | Amodrill® 1000 | Blend 1 |
|---|---|---|---|
| Biodegradation Ratio | 2.83 | 1.0 | 0.7 |
| Toxicity Ratio |  | 1.0 | 0.7 |
| Carbon Number Distribution (weight percent) | | | |
| C14 | 0.57 | 0.22 | 0.43 |
| C16 | 99.43 | 54.33 | 59.59 |
| C18 | — | 36.98 | 32.90 |
| C20 | — | 7.13 | 6.33 |
| C22+ | — | 1.33 | 0.75 |
| Olefin Distribution (mole Percent) | | | |
| Vinyl | — | 11.54 | 9.57 |
| Internal Olefins | 9.56 | 56.50 | 52.05 |
| Trisubstituted Olefins | 85.15 | 25.86 | 31.08 |
| Vinylidene | 5.29 | 6.10 | 6.58 |

Surprisingly and unexpectedly, Blend 1 has a biodegradation ratio better than both the material of Example 1 and the Amodrill® 1000. Blend 1 also has a toxicity ratio better than the Amodrill® 1000.

Example 2

The material of Example 2 was prepared by dimerizing 1-octene with an Amberlyst™ 35 dry catalyst using a continuous flow thru reactor with a recirculating recycle stream for 6 hours at 190 degrees Celsius to form the resultant material. The resultant material was then distilled to collect the C16 portion and form the material of Example 2. The material of Example 2 was then blended at a ratio of 10 weight percent of the material of Example 2 and 90 weight percent Amodrill® 1000 to form Blend 2. Table 2 shows the analysis of the materials of Example 2 using the analytical techniques of Example 1.

Figure 2:
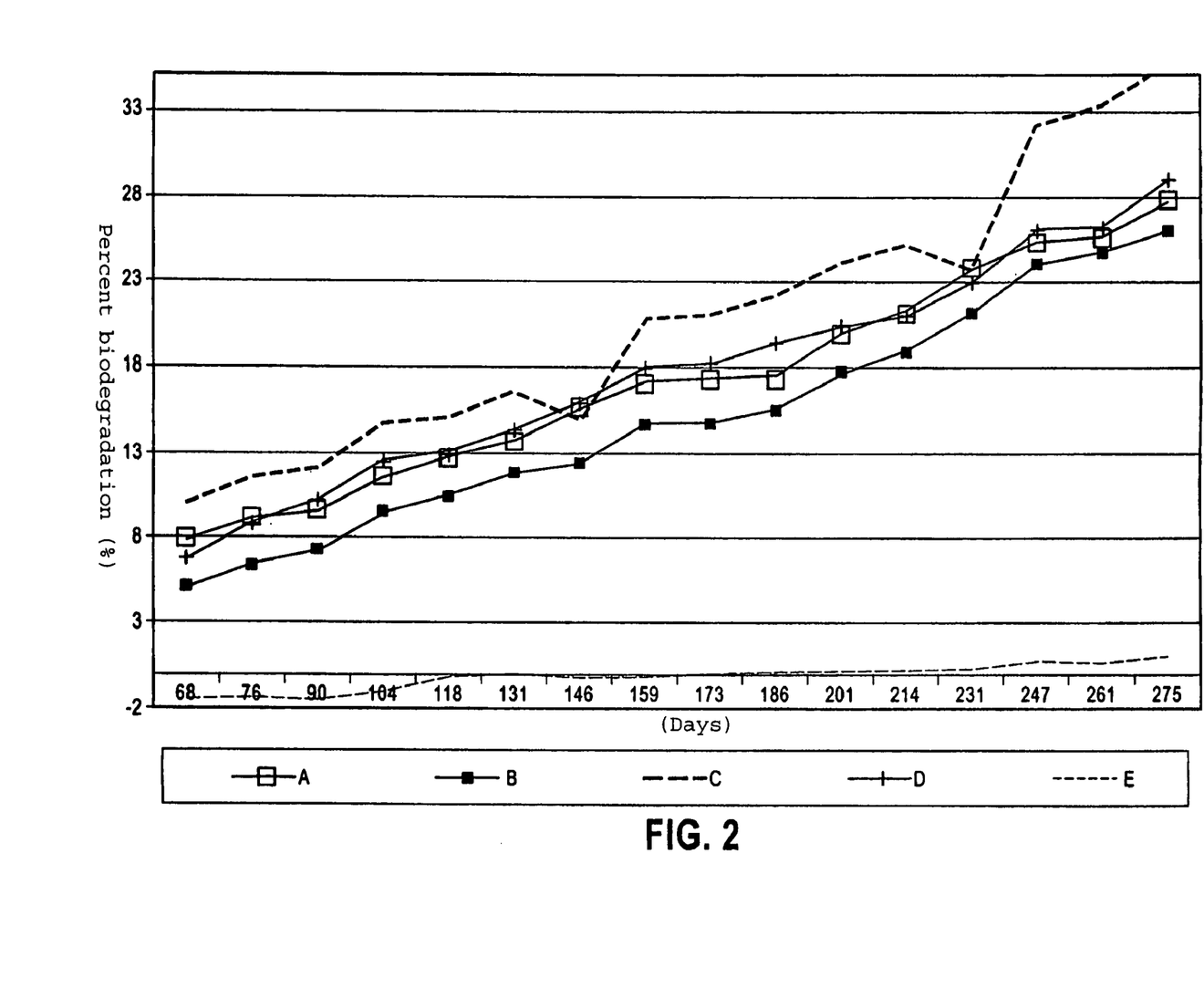
FIG. 2 shows a biodegradation graph of materials used in Example 2 and according to one embodiment.

FIG. 2 shows a graph of time in days (0 days to 275 days on x axis) versus percent biodegradation (higher is better on y axis) to the reference sample per the biodegradation test described above, for the reference sample (series A), the Amodrill® 1000 (series B), a 10 weight percent blend of the material of Example 2 and the Amodrill® 1000 (series C), a 20 weight percent blend of the material of Example 2 and the Amodrill® 1000 (series D), and a neat sample of the material of Example 2 (series E).

TABLE 2

|  | Example 2 | Amodrill® 1000 | Blend 2 |
|---|---|---|---|
| Biodegradation Ratio | 42.06 | 1.0 | 0.8 |
| Toxicity Ratio |  | 1.0 | 0.6 |
| Carbon Number Distribution (weight percent) | | | |
| C14 | 2.20 | 0.22 | 0.31 |
| C16 |  | 54.33 | 61.18 |
| C18 | — | 36.98 | 33.21 |
| C20 |  | 7.13 | 4.87 |
| C22+ |  | 1.33 | 0.43 |

TABLE 2-continued

|  | Example 2 | Amodrill® 1000 | Blend 2 |
|---|---|---|---|
| Olefin Distribution (mole Percent) | | | |
| Vinyl | 2.98 | 11.54 | 11.25 |
| Internal Olefins | 9.96 | 56.50 | 57.02 |
| Trisubstituted Olefins | 85.78 | 25.86 | 29.89 |
| Vinylidene | 1.28 | 6.10 | 6.84 |

Surprisingly and unexpectedly, Blend 2 has a biodegradation ratio better than both the material of Example 2 and the Amodrill® 1000. Blend 2 also has a toxicity ratio better than the Amodrill® 1000.

Example 3

The material of Example 3 was prepared by oligomerizing 1-octene using boron trifluoride catalyst with 2-methoxyethanol as a promoter, according to Theriot, U.S. Pat. No. 5,068,487. The entire contents and teachings of Theriot, U.S. Pat. No. 5,068,487 are hereby incorporated by reference in its entirety. The resultant material was then distilled to collect the C16 portion and form the material of Example 3. A first sample of the material of Example 3 was blended at a ratio of 10 weight percent of the material of Example 3 and 90 weight percent Amodrill® 1000 to form Blend 3A. A second sample of the material of Example 3 was blended at a ratio of 30 weight percent the material of Example 3 and 70 weight percent Amodrill® 1000 to form Blend 3B. Table 3 shows the analysis of the materials of Example 3 using the analytical techniques of Example 1.

Figure 3:
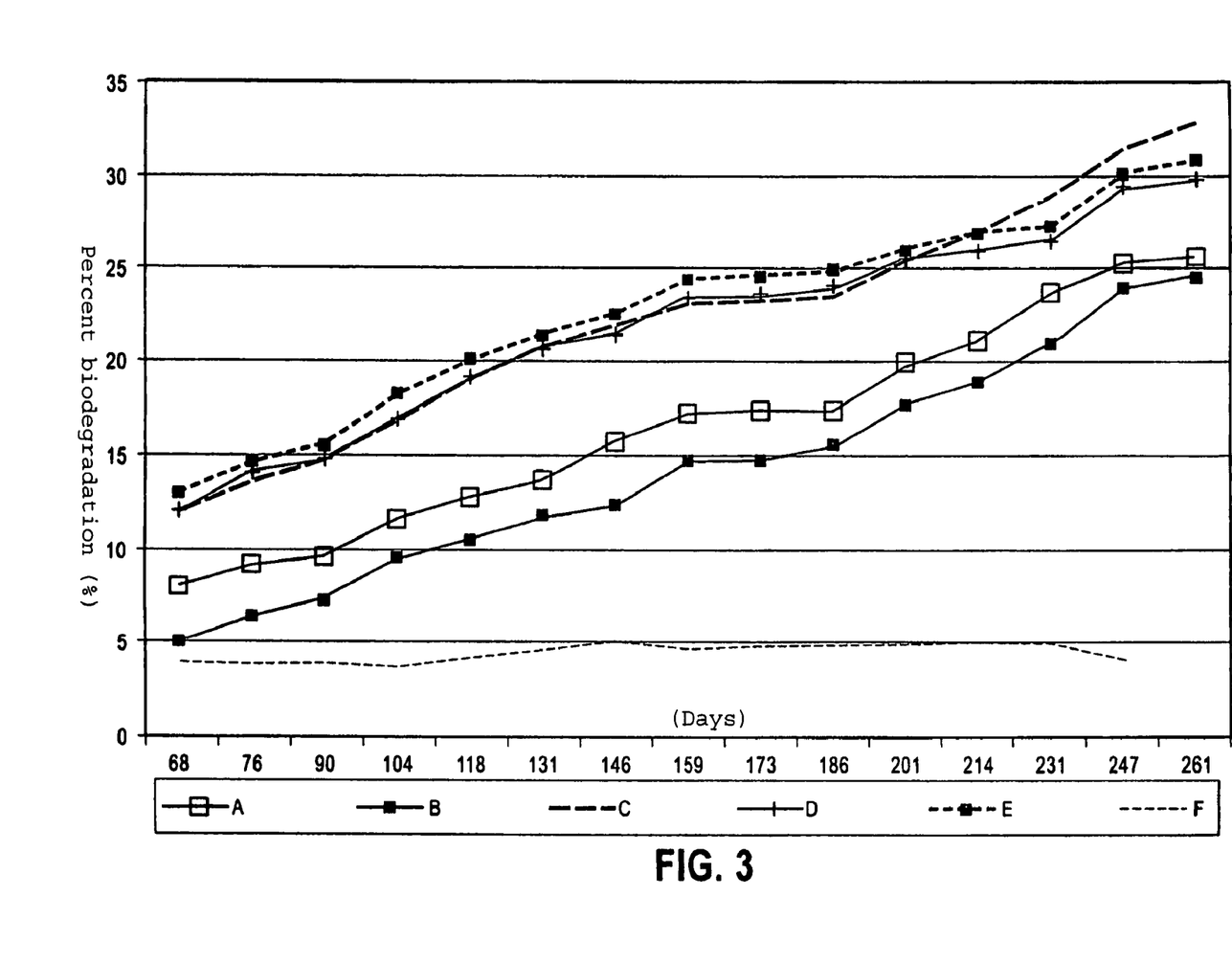
FIG. 3 shows a biodegradation graph of materials used in Example 3 and according to one embodiment.

FIG. 3 shows a graph of time in days (0 days to 275 days on x axis) versus percent biodegradation (higher is better on y axis) to the reference sample per the biodegradation test described above, for the reference sample (series A) Amodrill® 1000 (series B), a 10 weight percent blend of the material of Example 3 and the Amodrill® 1000 (series C), a 20 weight percent blend of the material of Example 3 and the Amodrill® 1000 (series D), a 30 weight percent blend of the material of Example 3 and the Amodrill® 1000 (series E), and a neat sample of the material of Example 3 (series F).

TABLE 3

|  | Example 3 | Amodrill® 1000 | Blend 3A | Blend 3B |
|---|---|---|---|---|
| Biodegradation Ratio | 6.00 | 1.0 | 0.8 | 0.8 |
| Toxicity Ratio | — | 1.0 | 1.0 | — |
| Carbon Number Distribution (weight percent) | | | | |
| C14 | 1.90 | 0.22 | 0.3 | 0.2 |
| C16 | 98.10 | 54.33 | 60.7 | 68.6 |
| C18 | — | 36.98 | 33.5 | 25.8 |
| C20 | — | 7.13 | 5.0 | 4.9 |
| C22+ | — | 1.33 | 0.5 | 0.5 |
| Olefin Distribution (mole Percent) | | | | |
| Vinyl | 2.11 | 11.54 | 11.2 | 11.9 |
| Internal Olefins | 6.64 | 56.50 | 52.0 | 42.1 |
| Trisubstituted Olefins | 89.31 | 25.86 | 30.0 | 38.8 |
| Vinylidene | 1.94 | 6.10 | 6.9 | 7.2 |

Surprisingly and unexpectedly, Blends 3A and 3B have a biodegradation ratio better than both the material of Example 3 and the Amodrill® 1000. Blend 3A also has a toxicity ratio at least as good as the Amodrill® 1000.

Example 4

The material of Example 4 was prepared by oligomerizing 1-octene using boron trifluoride catalyst with 2-methoxyethanol as a promoter, according to Theriot, U.S. Pat. No. 5,068,487. The resultant material was then distilled to remove the monomer portion from the resultant dimer/trimer and heavier stream to form the material of Example 4. A first sample of the material of Example 4 was blended at a ratio of 10 weight percent of the material of Example 4 and 90 weight percent Amodrill® 1000 to form Blend 4A. A second sample of the material of Example 4 was blended with 20 weight percent of the material of Example 4 and 80 weight percent Amodrill® 1000 to form Blend 4B. Table 4 shows the analysis of the materials of Example 4 using the analytical techniques of Example 1.

Figure 4:
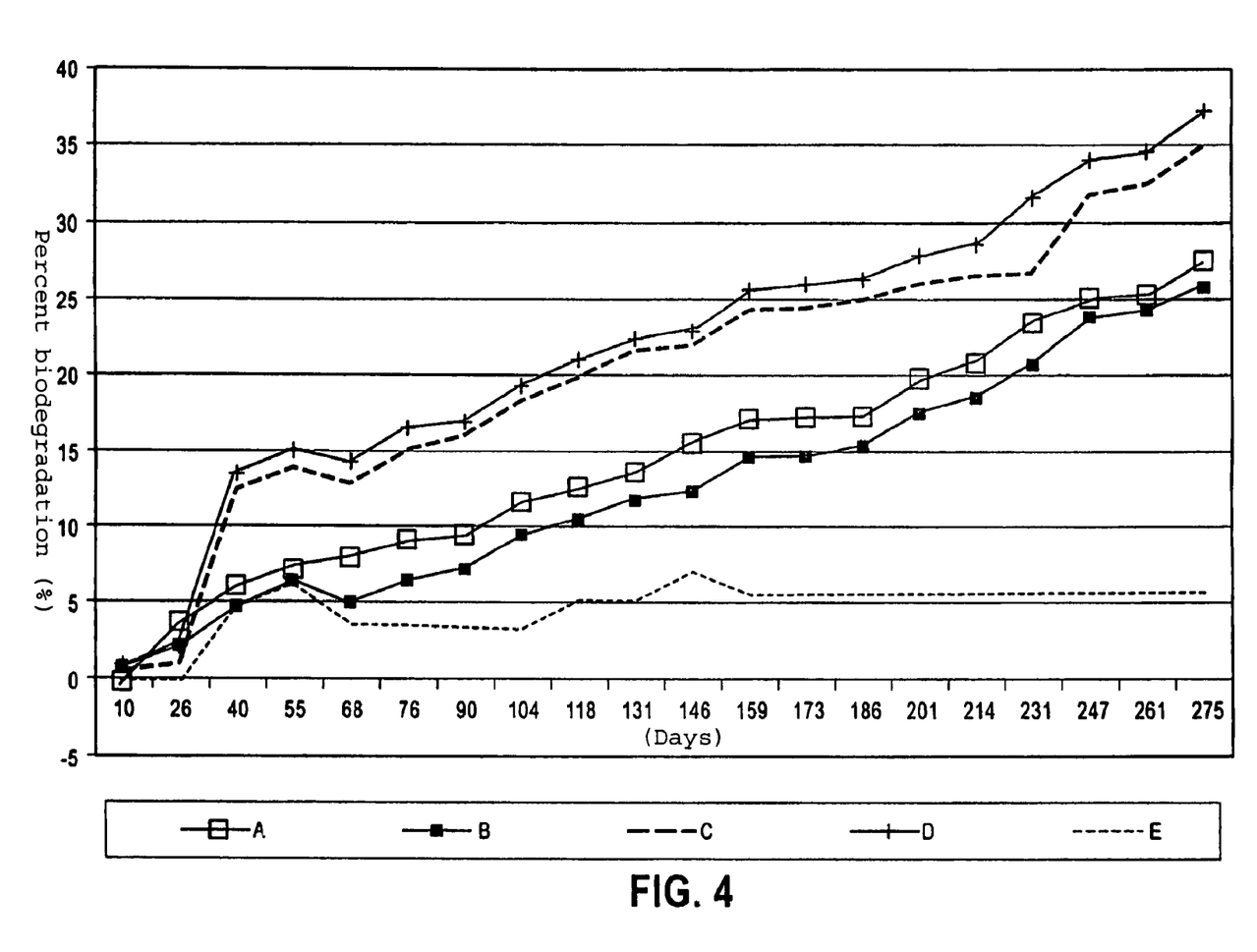
FIG. 4 shows a biodegradation graph of materials used in Example 4 and according to one embodiment.

FIG. 4 shows a graph of time in days (0 days to 275 days on x axis) versus percent biodegradation (higher is better on y axis) to the reference sample per the biodegradation test described above, for the reference sample (series A), Amodrill® 1000 (series B), a 10 weight percent blend of the material of Example 4 and the Amodrill® 1000 (series C), a 20 weight percent blend of the material of Example 4 and the Amodrill® 1000 (series D), and a neat sample of the material of Example 4 (series E).

TABLE 4

|  | Example 4 | Amodrill® 1000 | Blend 4A | Blend 4B |
|---|---|---|---|---|
| Biodegradation Ratio | 4.99 | 1.0 | 0.80 | 0.70 |
| Toxicity Ratio | 1.00 | 1.0 | — | 0.90 |
| Carbon Number Distribution (weight percent) | | | | |
| C14 | 1.51 | 0.22 | 0.25 | 0.19 |
| C16 | 69.75 | 54.33 | 56.89 | 58.63 |
| C18 | — | 36.98 | 34.08 | 31.54 |
| C20 | — | 7.13 | 6.37 | 5.44 |
| C22+ | 28.74 | 1.33 | 2.41 | 7.24 |
| Olefin Distribution (mole Percent) | | | | |
| Vinyl | 2.11 | 11.54 | 11.19 | 11.90 |
| Internal Olefins | 6.64 | 56.50 | 51.95 | 42.10 |
| Trisubstituted Olefins | 89.31 | 25.86 | 29.96 | 38.80 |
| Vinylidene | 1.94 | 6.10 | 6.89 | 7.20 |

Surprisingly and unexpectedly, Blends 4A and 4B have a biodegradation ratio better than both the material of Example 4 and the Amodrill® 1000. Blend 4B has a toxicity ratio at least as good as the Amodrill® 1000.

Example 5

Different amounts of the material of Example 4 were blended with Amodrill® 1000. The material of Example 4 has a pout point of less than –66 degrees Celsius. The resulting blends showed lowered pour points in Table 5.

TABLE 5

| Sample Amount (weight percent) | Pour Point Decrease (degrees Celsius) |
|---|---|
| 0 | 0 |
| 20 | –3 |
| 30 | –6 |
| 40 | –12 |

While the above specification has been focused on drilling fluids, one of skill in the art readily appreciates that the fluids and fluid components disclosed herein may also be readily be used for various other applications, such as surfactants, lubricating oils, lubricating oil additives, anhydrides, paper making chemicals, paper sizing agents, metal working fluids, cutting oils, quench oils, mining fluids, and/or the like.

As used herein the terms "having", "comprising", and "including" are open and inclusive expressions. Alternately, the term "consisting" is a closed and exclusive expression. Should any ambiguity exist in construing any term in the claims or the specification, the intent of the drafter is toward open and inclusive expressions.

Regarding an order, number, sequence, and/or limit of repetition for steps in a method or process, the drafter intends no implied order, number, sequence and/or limit of repetition for the steps to the scope of the invention, unless explicitly provided.

Regarding ranges, ranges are to be construed as including all points between the upper and lower values, such as to provide support for all possible ranges contained between the upper and lower values including ranges with no upper bound and/or lower bound.

It will be apparent to those skilled in the art that various modifications and variations can be made in the disclosed structures and methods without departing from the scope or spirit of the invention. Particularly, descriptions of any one embodiment can be freely combined with descriptions or other embodiments to result in combinations and/or variations of two or more elements or limitations. Other embodiments of the invention will be apparent to those skilled in the art from consideration of the specification and practice of the invention disclosed herein. It is intended that the specification and examples be considered exemplary only, with a true scope and spirit of the invention being indicated by the following claims.

What is claimed is:

1. A drilling fluid suitable for use in environmentally sensitive areas, the fluid comprising:
    a linear portion comprising linear alpha olefins or linear internal olefins with carbon numbers of between about 6 carbons to about 30 carbons; and an oligomer portion comprising dimers, trimers, and heavier oligomers of molecules with carbon numbers of between about 4 carbons and about 12 carbons, the trimers and heavier oligomers comprise at least about 20 mole percent of the oligomer portion, the oligomer portion comprises at least about 50 mole percent of trisubstituted molecules;
    wherein the fluid has a pour point of about –20 degrees Celsius or lower, a biodegradation ratio of less than or equal to about 1.0, and a toxicity ratio of less than or equal to about 1.0.

2. The fluid of claim 1, wherein said oligomer portion have been made by acid type catalysts.

3. The fluid of claim 2, wherein the acid type catalysts comprise boron trifluoride promoted with a protic co-catalyst, an aprotic co-catalyst, or mixtures thereof.

4. The fluid of claim 3, wherein the acid type catalysts comprise boron trifluoride promoted by an alcohol alkoxylate.

5. The fluid of claim 4, wherein the alcohol alkoxylate comprises 2-methoxyethanol.

6. The fluid of claim 1, wherein said oligomer portion comprise predominantly dimers and trimers of 1-octene with a dimer to trimer ratio of greater than about 1:1.

7. The fluid of claim 6, wherein said oligomer portion comprises at least about 90 weight percent dimer.

8. The fluid of claim 2, wherein said acid type catalysts comprise a heterogeneous solid acid catalyst.

9. The fluid of claim 8, wherein said heterogeneous solid acid catalyst comprises polymeric resin.

10. The fluid of claim 1, wherein said liner portion comprises isomerized vinylidene olefins with a chain length of between about C12 and about C24.

11. The fluid of claim 10, wherein said vinylidene olefins comprise hexadecene.

12. The fluid of claim 11, wherein said vinylidene olefins have been made by alkyl aluminum catalyzed dimerization of 1-octene.

13. The fluid of claim 1, wherein the fluid has a biodegradation ratio of less than or equal to about 1.0 as measured by United States Environmental Protection Agency NPDES 2007 (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico, Protocol for the determination of degradation of Non-Aqueous base fluids in a marine closed bottle biodegradation test system, where the fluid is compared to a reference standard of internal olefin molecules having 65 mole percent of molecules with a carbon number of 16 carbons and 35 mole percent of molecules with a carbon number of 18 carbons.

14. The fluid of claim 1, wherein the fluid has an improved biodegradability of at least about 10 percent over both a biodegradability of said linear portion component alone and said oligomer portion component alone.

15. The fluid of claim 1, wherein the fluid has a toxicity ratio of less than or equal to about 1.0, as measured by American Society for Testing and Materials method E1367-99 testing protocol as required in the United States Environmental Protection Agency NPDES (National Pollution Discharge Elimination System) General Permit for New and Existing Sources and New Dischargers in the Offshore Subcategory of the Oil and Gas Extraction Category for the Western Portion of the Outer Continental Shelf of the Gulf of Mexico which uses Leptocheirus Plumulosus in a 10-day sediment toxicity test to compare the fluid to a reference standard of internal olefin molecules having 65 mole percent of molecules with a carbon number of 16 carbons and 35 mole percent of molecules with a carbon number of 18 carbons.

16. The fluid of claim 1, wherein the fluid has an improved toxicity of at least about 10 percent over both a toxicity of the first fluid component alone and the second drilling fluid component alone.

17. The fluid of claim 1, wherein the fluid comprises less than about 0.00001 grams of polycyclic aromatic hydrocarbons per gram of a base fluid.

18. The fluid of claim 1, wherein said linear portion component is not isomerized or hydrogenated.

19. The fluid of claim 1, further comprising linear alpha olefins, linear internal olefins, branched olefins, branched internal olefins, esters, water, mineral oils, enhanced mineral oils, oil-in-water emulsions, water-in-oil emulsions, paraffins, fatty acids, or mixtures thereof.

* * * * *